(12) United States Patent
Punathil

(10) Patent No.: US 12,045,161 B2
(45) Date of Patent: Jul. 23, 2024

(54) ENVIRONMENT SPECIFIC SOFTWARE TEST FAILURE ANALYSIS

(71) Applicant: International Business Machines Corporation, Armonk, NY (US)

(72) Inventor: Gireesh Punathil, Kannur (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 195 days.

(21) Appl. No.: 17/575,844

(22) Filed: Jan. 14, 2022

(65) Prior Publication Data

US 2023/0229586 A1 Jul. 20, 2023

(51) Int. Cl.
*G06F 11/36* (2006.01)

(52) U.S. Cl.
CPC ...... *G06F 11/3688* (2013.01); *G06F 11/3664* (2013.01); *G06F 11/3692* (2013.01)

(58) Field of Classification Search
CPC ............ G06F 11/3688; G06F 11/3664; G06F 11/3692
See application file for complete search history.

(56) References Cited

U.S. PATENT DOCUMENTS

| | | | |
|---|---|---|---|
| 7,509,538 B2 | 3/2009 | Triou, Jr. et al. | |
| 9,710,364 B2 | 7/2017 | Herzig et al. | |
| 9,710,371 B2 | 7/2017 | Tosar et al. | |
| 9,870,314 B1* | 1/2018 | Vyas | G06F 11/3664 |
| 11,586,534 B2* | 2/2023 | Qin | G06F 11/3692 |
| 2007/0198445 A1 | 8/2007 | Zen | |
| 2008/0222501 A1 | 9/2008 | Travison et al. | |
| 2013/0152047 A1* | 6/2013 | Moorthi | G06F 11/3688 717/124 |
| 2014/0282410 A1* | 9/2014 | Chan | G06F 11/3664 717/124 |
| 2019/0087315 A1 | 3/2019 | Tailor et al. | |
| 2019/0196946 A1* | 6/2019 | Budhai | G06F 11/3692 |
| 2019/0243753 A1* | 8/2019 | Zhang | G06F 11/3684 |
| 2019/0340512 A1 | 11/2019 | Vidal et al. | |
| 2020/0183821 A1 | 6/2020 | Qin et al. | |
| 2023/0062632 A1* | 3/2023 | Liu | G06F 9/5038 |

OTHER PUBLICATIONS

Luo, Qingzhou, et al. "An empirical analysis of flaky tests." Proceedings of the 22nd ACM SIGSOFT international symposium on foundations of software engineering. 2014. (Year: 2014).*

(Continued)

*Primary Examiner* — Kevin L Young
*Assistant Examiner* — Joanne G Macasiano
(74) *Attorney, Agent, or Firm* — Garg Law Firm, PLLC; Rakesh Garg; Kimberly Zillig

(57) ABSTRACT

By analyzing a test case in a set of test cases, the test case is classified into a test type. Using a result of analyzing a test execution environment, a flake parameter is set, the flake parameter comprising an execution environment characteristic capable of causing an inconclusive result of execution of the test case. Responsive to determining that the test type maps to the flake parameter, the test case is removed from the set of test cases, the removing resulting in a filtered set of test cases, the determining performed using a predefined set of mappings. The filtered set of test cases is executed in the test execution environment.

20 Claims, 8 Drawing Sheets

(56) References Cited

OTHER PUBLICATIONS

Ziftci, Celal, and Diego Cavalcanti. "De-flake your tests: Automatically locating root causes of flaky tests in code at google." 2020 IEEE International Conference on Software Maintenance and Evolution (ICSME). IEEE, 2020. (Year: 2020).*

Alshammari et al., FlakeFlagger: Predicting Flakiness Without Rerunning Tests, 2021 IEEE/ACM 43rd International Conference on Software Engineering (ICSE), May 7, 2021.

Bell et al., DeFlaker: Automatically Detecting Flaky Tests, ICSE '18, May 27-Jun. 3, 2018.

* cited by examiner

ENVIRONMENT SPECIFIC SOFTWARE TEST FAILURE ANALYSIS

BACKGROUND

The present invention relates generally to a method, system, and computer program product for software test failure analysis. More particularly, the present invention relates to a method, system, and computer program product for environment specific software test failure analysis.

In software development, a developer often modifies a module of an existing application, or adds a new module to an application. In addition to testing functionality of the new or modified module, the modified application is also tested using a pre-defined set of software tests, to confirm that addition or modification of one module has not altered other application functionality. However, not all test results reported as failures are actually application failures. Instead, for example, a test including opening a connection to a remote endpoint and transporting data to and from the remote endpoint, but the test might have failed because a network or the remote endpoint were unavailable. As another example, a test might have timed out waiting for a response from another system because the source of the response was overloaded with other, unrelated, tasks. This type of test result is called a test flake, or flake—a test result that does not provide useful information, but instead is inconclusive or provides inconsistent results.

SUMMARY

The illustrative embodiments provide a method, system, and computer program product. An embodiment includes a method that classifies, by analyzing a test case in a set of test cases, the test case into a test type. An embodiment sets, using a result of analyzing a test execution environment, a flake parameter, the flake parameter comprising an execution environment characteristic capable of causing an inconclusive result of execution of the test case. An embodiment removes, from the set of test cases, responsive to determining that the test type maps to the flake parameter, the test case, the removing resulting in a filtered set of test cases, the determining performed using a predefined set of mappings. An embodiment executes, in the test execution environment, the filtered set of test cases.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
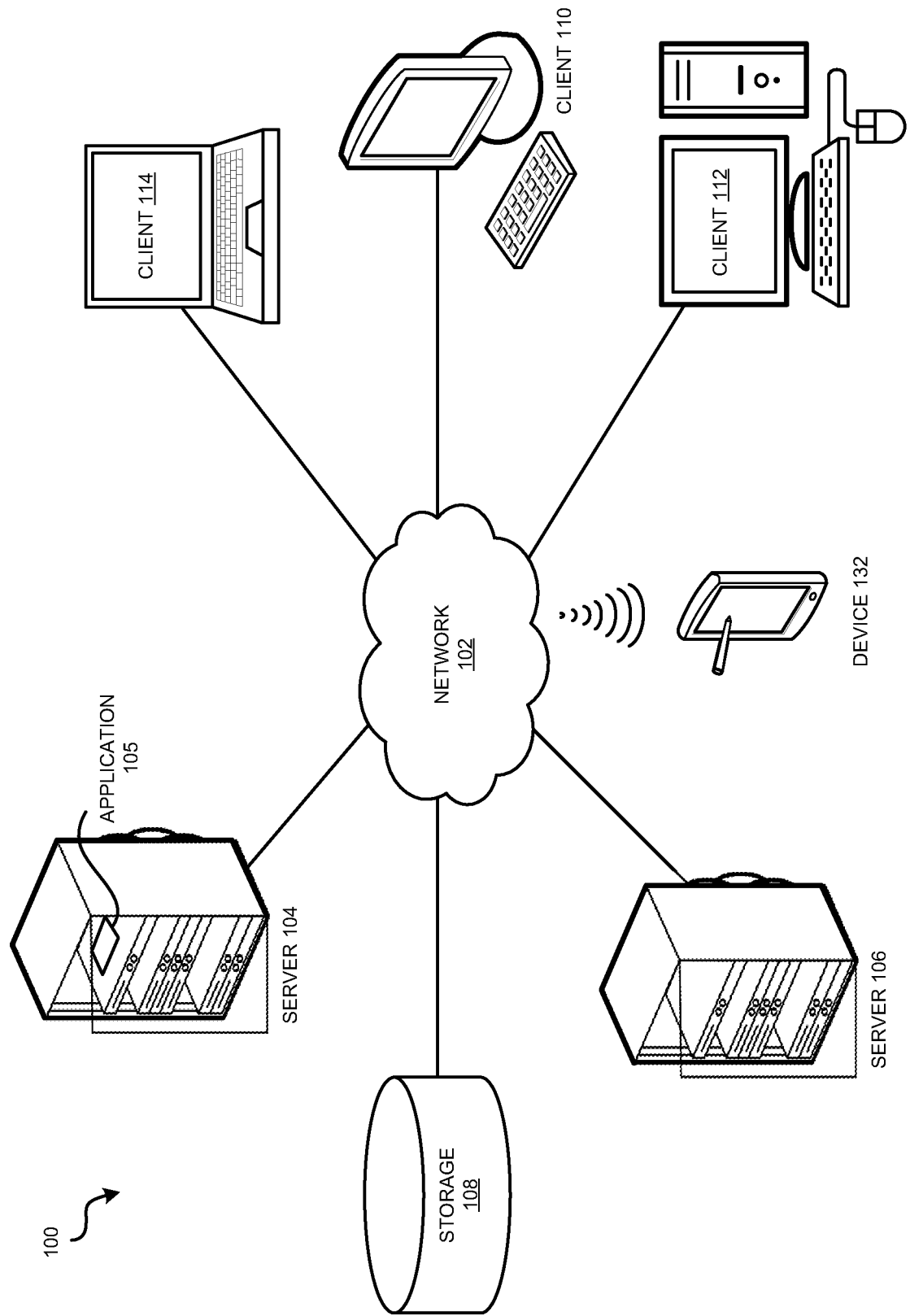
FIG. 1 depicts a block diagram of a network of data processing systems in which illustrative embodiments may be implemented.

The illustrative embodiments recognize that typical software applications undergo a continuous improvement process, in which bugs are fixed and new functionality added on a rolling basis, such as once a month or once a quarter. As application testing is an essential component of the development process, testing efficiency is important in improving overall application development time. Test failures require a developer or tester to investigate the failure and determine its cause, taking time. Hence, if as is typical ten to twenty percent of test failures are flakes, time spent investigating such failures is time wasted. In addition, a developer faced with inconsistent test results often simply reruns the same tests until receiving a result the developer deems acceptable (or gives up), wasting time, undermining confidence in the testing process, and risking missing a failure that actually needs investigation and fixing. Thus, the illustrative embodiments recognize that there is an unmet need to improve software development efficiency and application quality by reducing test flakes.

The illustrative embodiments recognize that the presently available tools or solutions do not address these needs or provide adequate solutions for these needs. The illustrative embodiments used to describe the invention generally address and solve the above-described problems and other problems related to environment specific software test failure analysis.

An embodiment can be implemented as a software application. The application implementing an embodiment can be configured as a modification of an existing automated software testing system, as a separate application that operates in conjunction with an existing automated software testing system, a standalone application, or some combination thereof.

Particularly, some illustrative embodiments provide a method that classifies, by analyzing a test case in a set of test cases, the test case into a test type, sets a flake parameter using a result of analyzing a test execution environment, removes the test case from the set of test cases responsive to determining that the test type maps to the flake parameter, and executes the filtered set of test cases in the test execution environment.

An embodiment analyzes one or more test cases in a test suite. A test suite is a set of test cases. To analyze a test case, one embodiment uses a test logic parser, a presently known technique, to parse source code of a test case and identify items such as one or more imported modules, method invocations or procedure calls, data the test is attempting to validate, assertions, and parameters of assertions. A test assertion is an expression which encapsulates testable logic about the code being tested. For example, one assertion might be that variable a is equal to variable b. If yes, the test result is a pass; otherwise, the test result is a failure. Some test assertions include parameters, i.e. prerequisites which much be true for the test assertion to be valid. An embodiment also analyzes a test case to identify an operating system or physical computer system capability used by the test case (e.g. a network data communication capability or multiple processor cores for use in testing concurrent execution). An embodiment also analyzes a test case to identify an execution dependency of the test case (e.g. whether execution performance of the test case is limited by memory capability, file system capability, or processing capability. Other test case analyses are also possible and contemplated within the scope of the illustrative embodiments.

Using a result of the analysis, an embodiment classifies a test case into one or more test types. One non-limiting example of a test type is data in a socket. A socket is a software structure serving as an endpoint for sending and receiving data across a computer network, used in testing networking functionality. Other non-limiting examples of test types are how much time elapses between two execution points in the test case, a data transformation, a status code from a process, expected dimensions of data, and contents of a file.

One embodiment analyzes one or more test cases before the set of test cases are executed. Another embodiment analyzes one or more test cases after the set of test cases are executed.

An embodiment analyzes a test execution environment in which the set of test cases is to be run or has already run. To analyze a test execution environment, an embodiment uses a presently known execution environment profiler. Using the analysis, an embodiment sets one or more flake parameters of the test execution environment. A flake parameter is an environment characteristic that could cause a flake. Some non-limiting examples of flake parameters are whether the test execution environment is hosted locally or relies on a network data connection, a current task load on the system or a classification of the task load as idle, loaded, or an intermediate state between idle and loaded, a system's execution concurrency capability (e.g. single-threaded versus multi-threaded operations) and the number of threads executable concurrently, resource limits of the system, the hardware and operating system used in the test execution environment (e.g. how much memory and how many processor cores and open files are available), and whether peripheral devices such as storage are implemented physically or virtually.

An embodiment uses a predefined mapping of test types to corresponding flake parameters to determine that the test type of the analyzed test case maps to one or more flake parameters set as a result of the test execution environment profiling. If so, an embodiment labels the analyzed test case as a flake. In the predefined mapping, a test type links to a flake parameter that, if set, could cause that test type to be a flake. For example, if a flake parameter is that the test execution environment is hosted locally, with no network connection available, a test type involving socket data will fail because no network connection is available, resulting in a flake. As another example, if a flake parameter is that the system is classified as loaded, a time delta computation test type might fail simply because the system is too overloaded to perform a computation within the time delta, resulting in a flake.

One embodiment removes a test cases labeled as a flake from the test of test cases, then executes the modified set of test cases. Removing flakes before testing improves testing efficiency, because tests that are likely to produce inconclusive results are simply not executed. Another embodiment provides one or more test cases labeled as flakes to a user via a user interface after test case execution, so the user is aware that these particular test failures do not require further user attention.

The manner of environment specific software test failure analysis described herein is unavailable in the presently available methods in the technological field of endeavor pertaining to software testing. A method of an embodiment described herein, when implemented to execute on a device or data processing system, comprises substantial advancement of the functionality of that device or data processing system in classifying, by analyzing a test case in a set of test cases, the test case into a test type, setting a flake parameter using a result of analyzing a test execution environment, removing the test case from the set of test cases responsive to determining that the test type maps to the flake parameter, and executing the filtered set of test cases in the test execution environment.

The illustrative embodiments are described with respect to certain types of test cases, test suites, test types, flake parameters, test results, mappings, parameters, profiling results, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
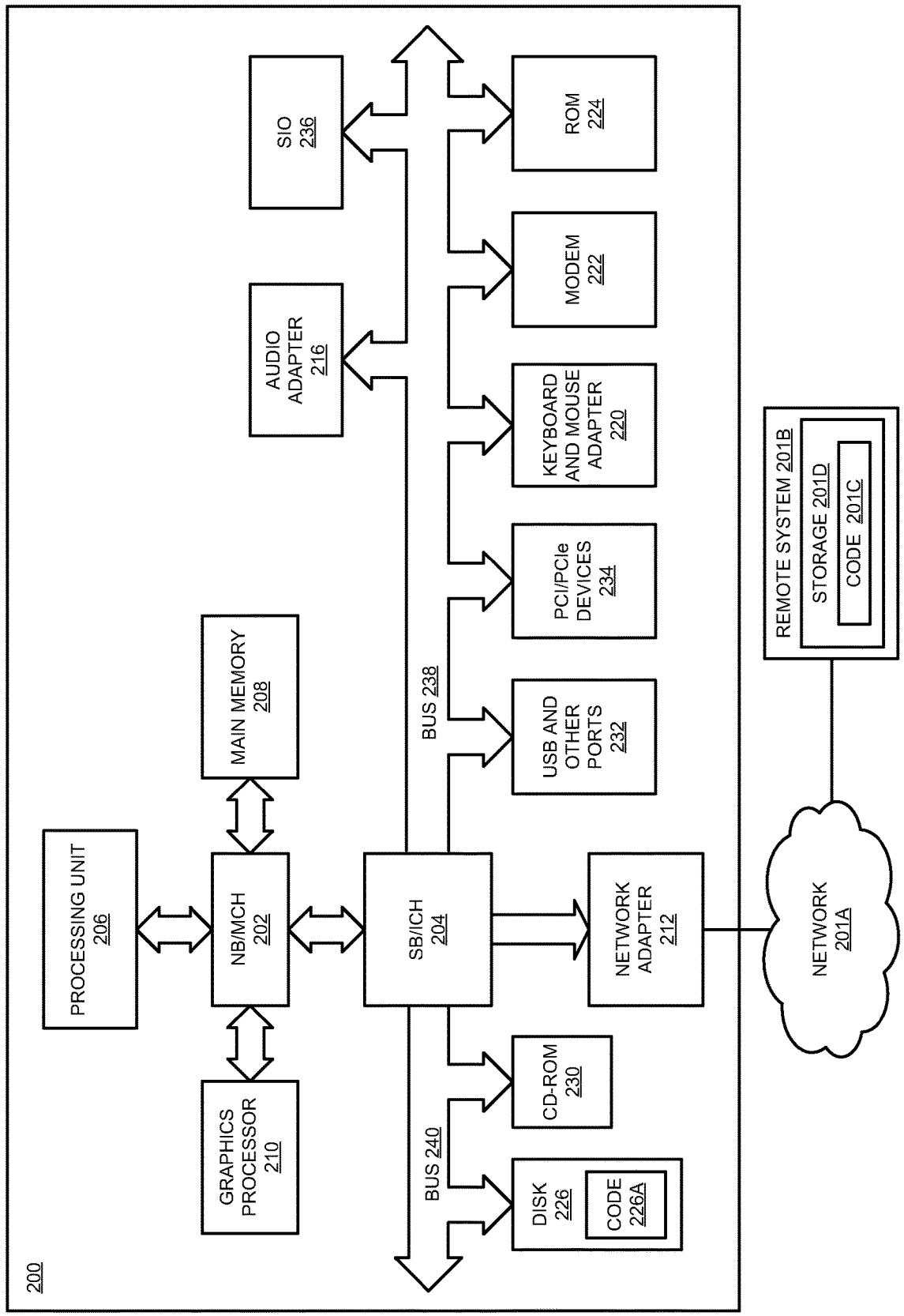
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. In addition, application 105 is capable of analyzing a test execution environment implemented in any of servers 104 and 106, clients 110, 112, and 114, and device 132. The test execution environment need not be implemented in the same system as the system in which application 105 executes.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
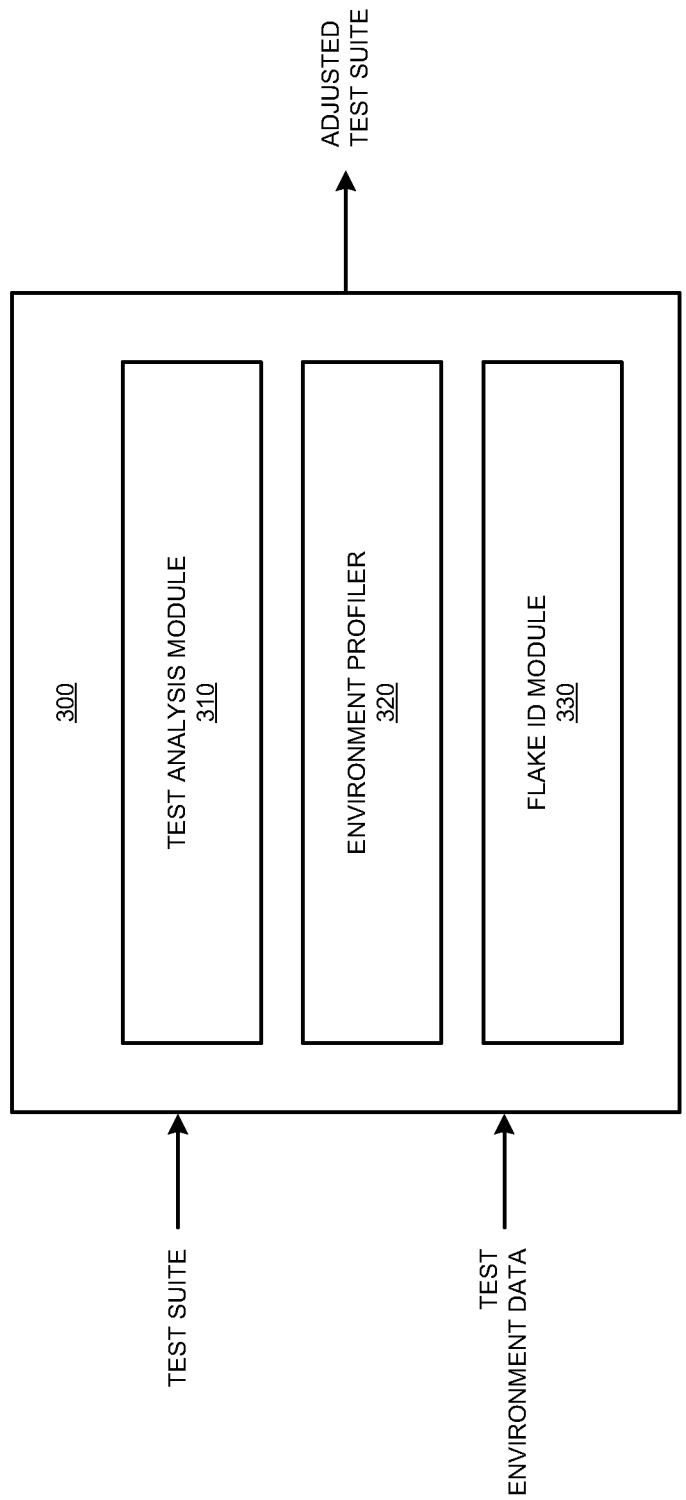
FIG. 3 depicts a block diagram of an example configuration for environment specific software test failure analysis in accordance with an illustrative embodiment.

With reference to FIG. 3, this figure depicts a block diagram of an example configuration for environment specific software test failure analysis in accordance with an illustrative embodiment. Application 300 is an example of application 105 in FIG. 1 and executes in any of servers 104 and 106, clients 110, 112, and 114, and device 132 in FIG. 1.

Test analysis module 310 analyzes one or more test cases in a test suite. To analyze a test case, module 310 uses a test logic parser, a presently known technique, to parse source code of a test case and identify items such as one or more imported modules, method invocations or procedure calls, data the test is attempting to validate, assertions, and parameters of assertions. A test assertion is an expression which encapsulates testable logic about the code being tested. For example, one assertion might be that variable a is equal to variable b. If yes, the test result is a pass; otherwise, the test result is a failure. Some test assertions include parameters, i.e. prerequisites which much be true for the test assertion to be valid. Module 310 also analyzes a test case to identify an operating system or physical computer system capability used by the test case (e.g. a network data communication capability or multiple processor cores for use in testing concurrent execution). Module 310 also analyzes a test case to identify an execution dependency of the test case (e.g. whether execution performance of the test case is limited by memory capability, file system capability, or processing capability.

Using a result of the analysis, module 310 classifies a test case into one or more test types. One non-limiting example of a test type is data in a socket. A socket is a software structure serving as an endpoint for sending and receiving data across a computer network, used in testing networking functionality. Other non-limiting examples of test types are how much time elapses between two execution points in the test case, a data transformation, a status code from a process, expected dimensions of data, and contents of a file.

In one implementation of application 300, module 310 analyzes one or more test cases before the set of test cases are executed. In another implementation of application 300, module 310 analyzes one or more test cases after the set of test cases are executed.

Environment profiler 320 analyzes a test execution environment in which the set of test cases is to be run or has already run. To analyze a test execution environment, environment profiler 320 uses a presently known execution environment profiler. Using the analysis, environment profiler 320 sets one or more flake parameters of the test execution environment. A flake parameter is an environment characteristic that could cause a flake. Some non-limiting examples of flake parameters are whether the test execution environment is hosted locally or relies on a network data connection, a current task load on the system or a classification of the task load as idle, loaded, or an intermediate state between idle and loaded, a system's execution concurrency capability (e.g. single-threaded versus multi-threaded operations) and the number of threads executable concurrently, resource limits of the system, the hardware and operating system used in the test execution environment (e.g. how much memory and how many processor cores and open files are available), and whether peripheral devices such as storage are implemented physically or virtually.

Flake identification module 330 uses a predefined mapping of test types to corresponding flake parameters to determine that the test type of the analyzed test case maps to one or more flake parameters set as a result of the test execution environment profiling. If so, module 330 labels the analyzed test case as a flake. In the predefined mapping, a test type links to a flake parameter that, if set, could cause that test type to be a flake. For example, if a flake parameter is that the test execution environment is hosted locally, with no network connection available, a test type involving socket data will fail because no network connection is available, resulting in a flake. As another example, if a flake parameter is that the system is classified as loaded, a time delta computation test type might fail simply because the system is too overloaded to perform a computation within the time delta, resulting in a flake.

One implementation of module 330 removes a test cases labeled as a flake from the test of test cases, then application 300 executes the modified set of test cases. Removing flakes before testing improves testing efficiency, because tests that are likely to produce inconclusive results are simply not executed. Another implementation of module 330 provides one or more test cases labeled as flakes to a user via a user interface after test case execution, so the user is aware that these particular test failures do not require further user attention.

Figure 4:
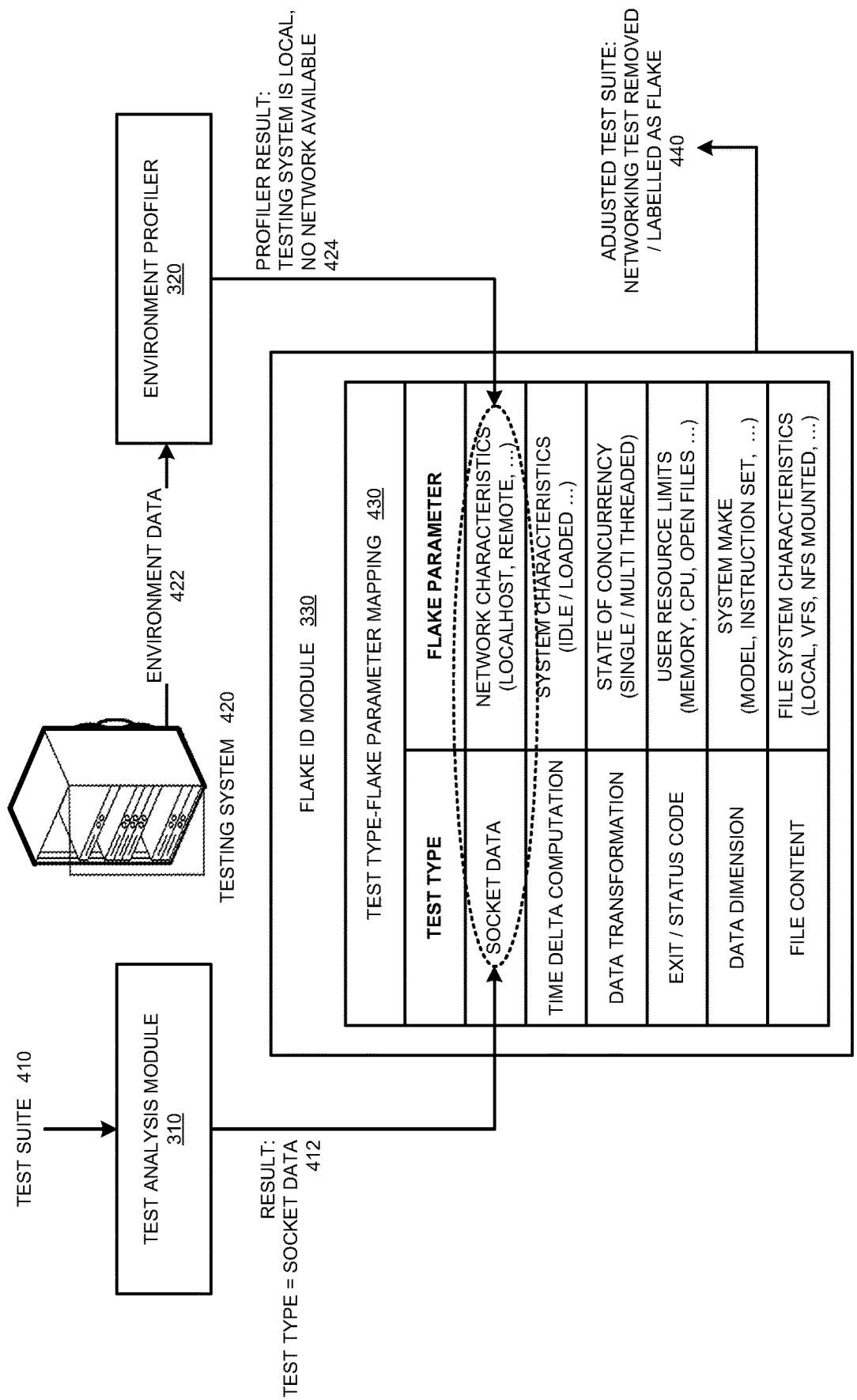
FIG. 4 depicts an example of environment specific software test failure analysis in accordance with an illustrative embodiment.

With reference to FIG. 4, this figure depicts an example of environment specific software test failure analysis in accordance with an illustrative embodiment. The example can be executed using application 300 in FIG. 3. Test analysis module 310, environment profiler 320, and flake identification module 330 are the same as test analysis module 310, environment profiler 320, and flake identification module 330 in FIG. 3. Testing system 420 is an example of any of servers 104 and 106, clients 110, 112, and 114, and device 132 in FIG. 1.

Test analysis module 310 analyzes a test case in test suite 410, producing result 412: the test type is socket data, indicating that the test case tests socket data.

Environment profiler 320 analyzes environment data 422 of testing system 420, a test execution environment in which the set of test cases is to be run or has already run. Using the analysis, environment profiler 320 determines profiler result 424: the testing system is local, and no network is available.

Flake identification module 330 uses test type-flake parameter mapping 430, a predefined mapping of test types to corresponding flake parameters, to determine that the test type of the analyzed test case maps to one or more flake parameters set as a result of the test execution environment profiling. Thus, because result 412 maps to the flake parameter corresponding to result 424, resulting in a flake module 330 generates adjusted test suite 440: a version of test suite 410 in which the analyzed test is removed or labelled as a flake.

Figure 5:
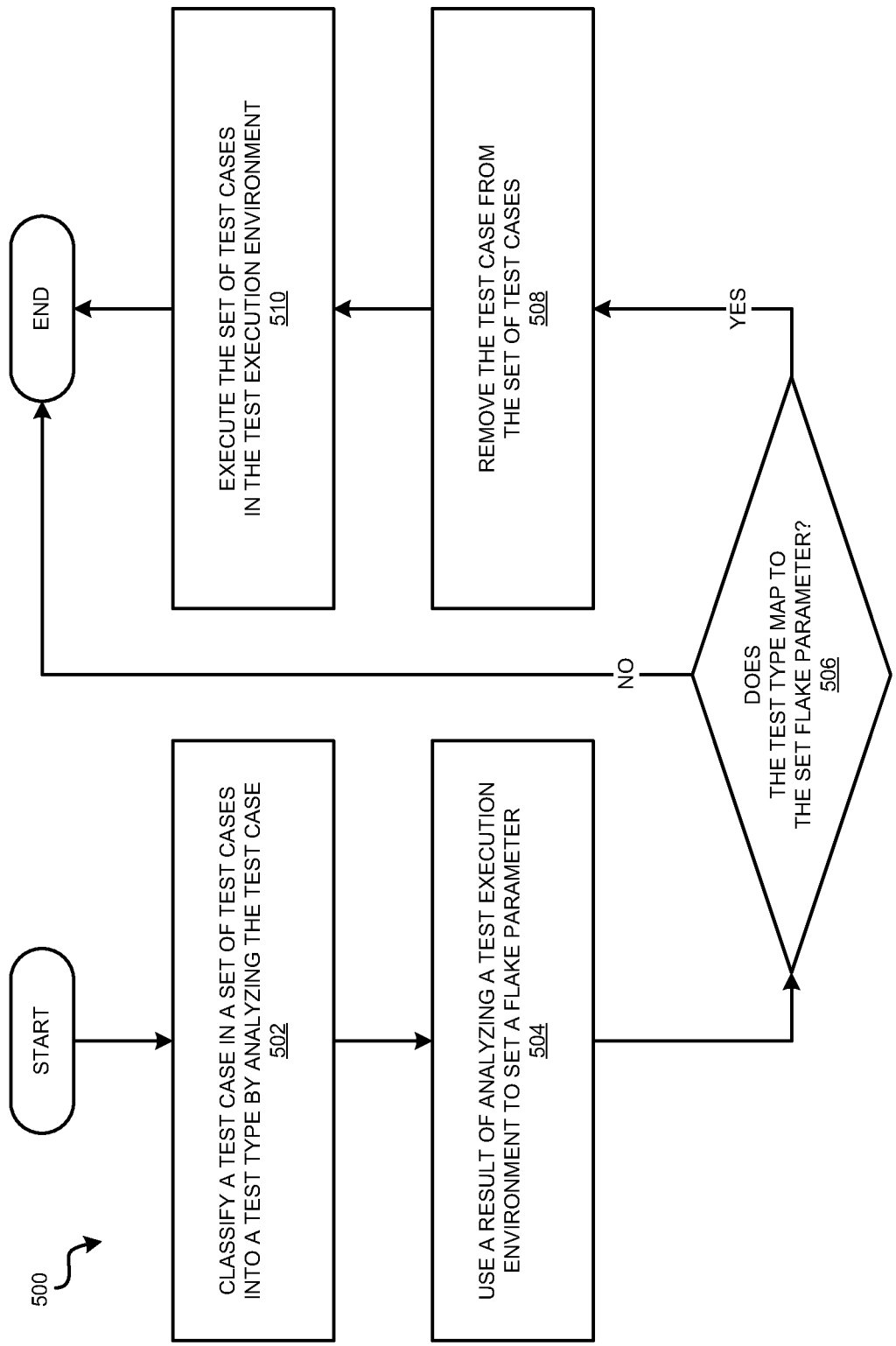
FIG. 5 depicts a flowchart of an example process for environment specific software test failure analysis in accordance with an illustrative embodiment.

With reference to FIG. 5, this figure depicts a flowchart of an example process for environment specific software test failure analysis in accordance with an illustrative embodiment. Process 500 can be implemented in application 300 in FIG. 3.

In block 502, the application classifies a test case in a set of test cases into a test type by analyzing the test case. In block 504, the application uses a result of analyzing a test execution environment to set a flake parameter. In block 506, the application checks whether the test type maps to the set flake parameter. If yes ("YES" path of block 506), in block 508, the application removes the test case from the set of test cases. In block 510, the application executes the set of test cases in the test execution environment. Then (also "NO" path of block 506) the application ends.

Figure 6:
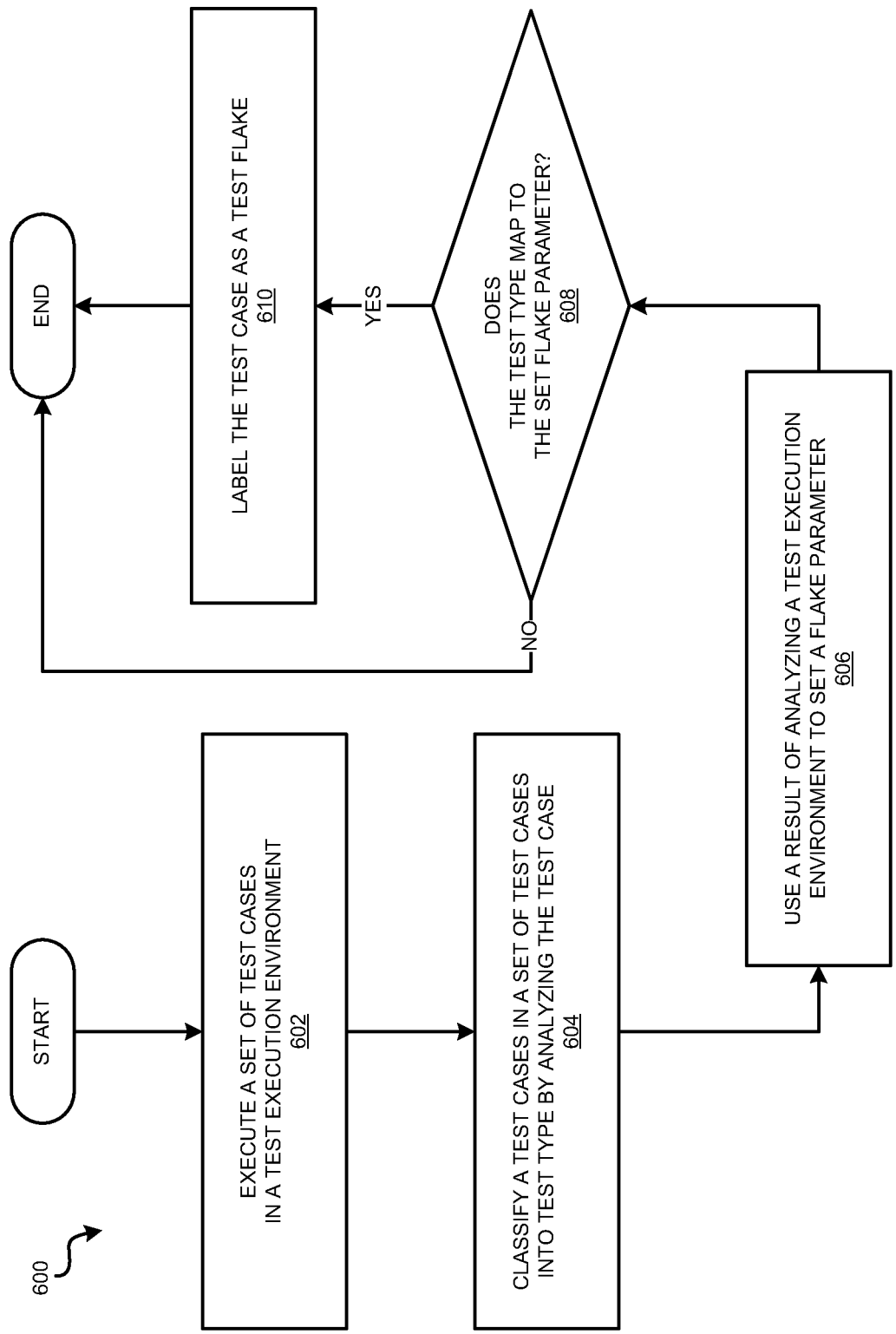
FIG. 6 depicts another flowchart of an example process for environment specific software test failure analysis in accordance with an illustrative embodiment.

With reference to FIG. 6, this figure depicts another flowchart of an example process for environment specific software test failure analysis in accordance with an illustrative embodiment. Process 600 can be implemented in application 300 in FIG. 3.

In block 602, the application executes a set of test cases in a test execution environment. In block 604, the application classifies a test case in the set of test cases into a test type by analyzing the test case. In block 606, the application uses a result of analyzing a test execution environment to set a flake parameter. In block 608, the application checks whether the test type maps to the set flake parameter. If yes ("YES" path of block 608), in block 610, the application removes the test case from the set of test cases. In block 610, the application. Then (also "NO" path of block 608) the application ends.

Figure 7:
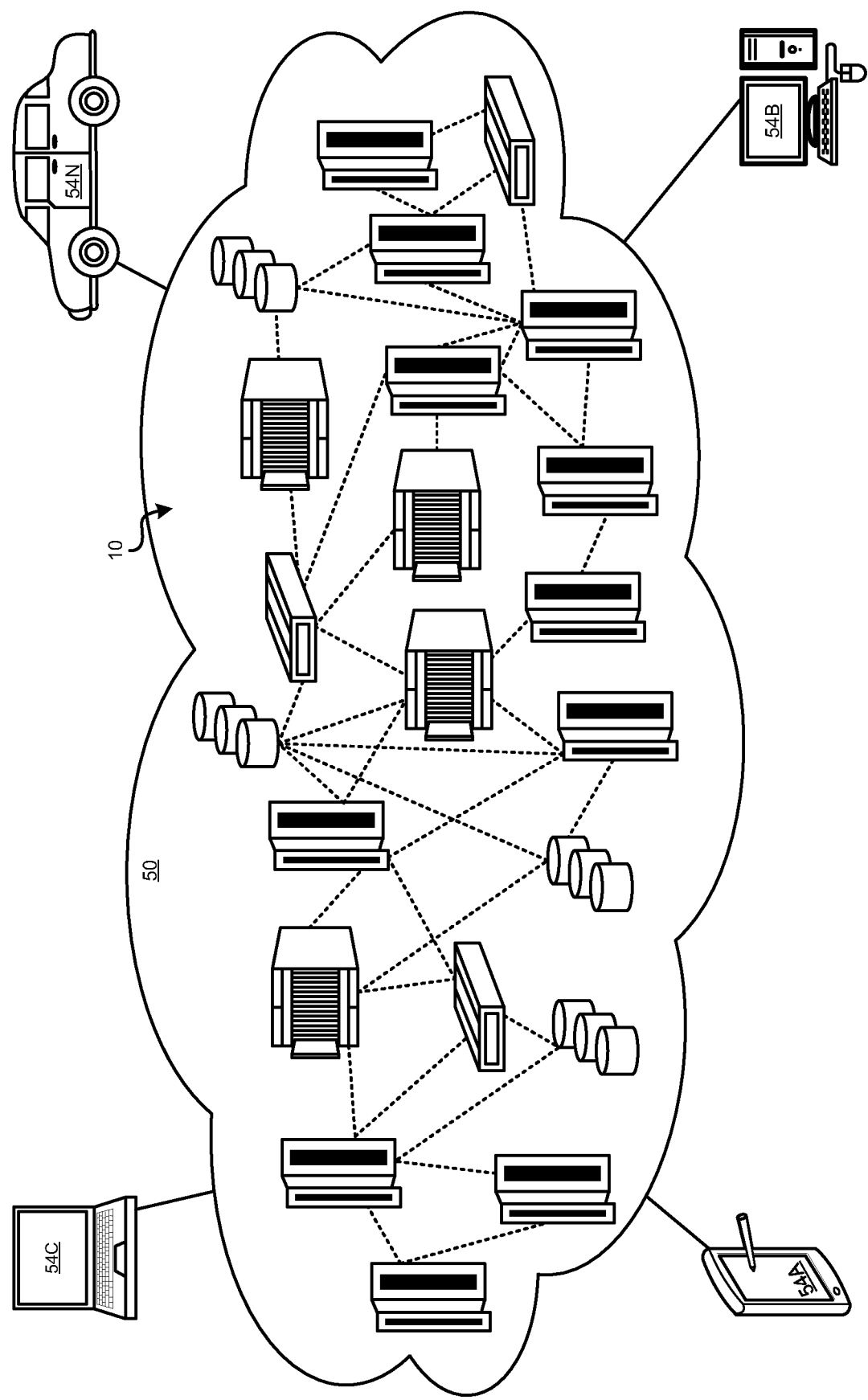
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
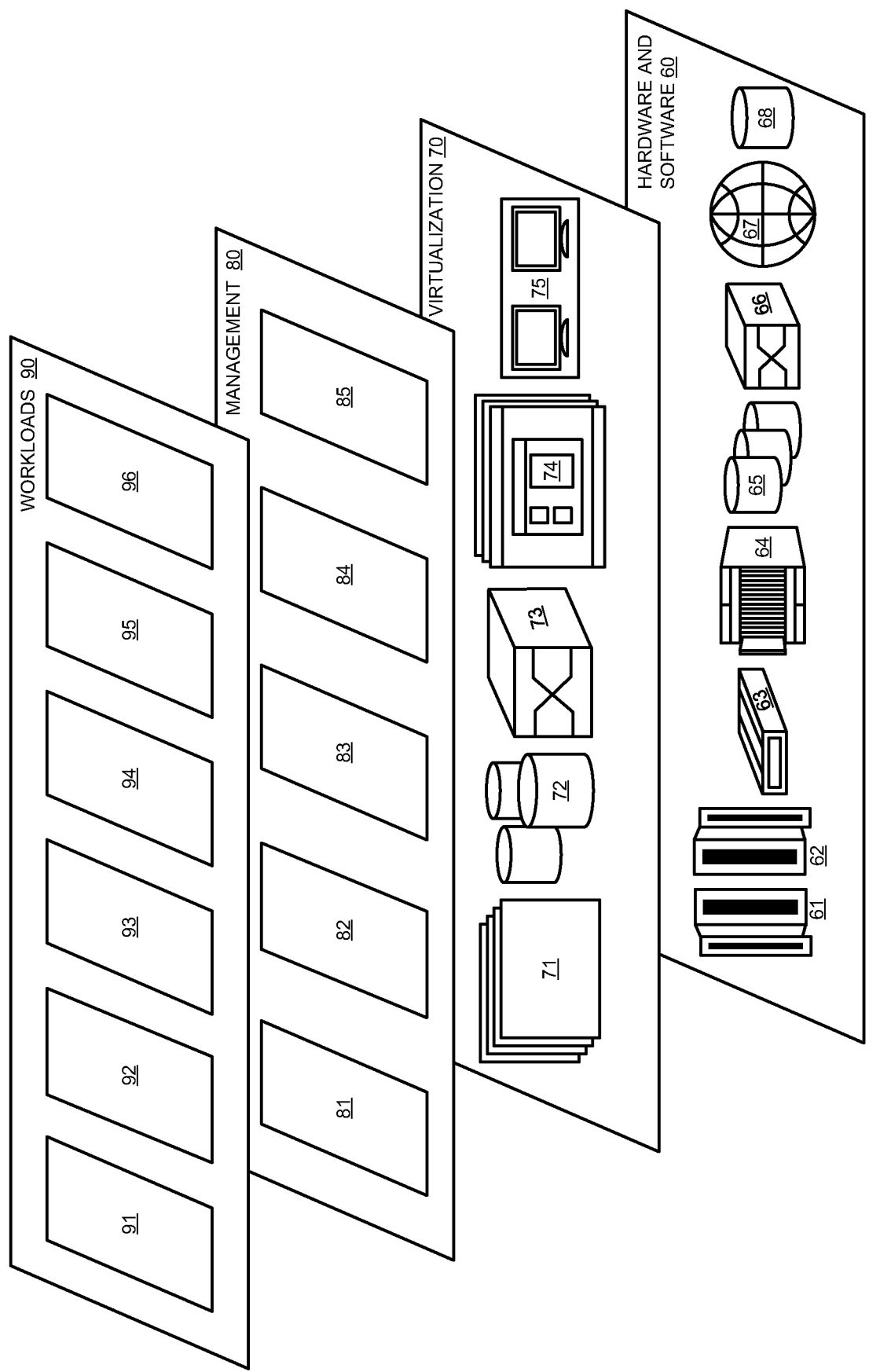
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for environment specific software test failure analysis and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   parsing source code of a test case in a set of test cases to identify a pre-requisite to performing the test case;
   classifying the test case into a test type, wherein the classifying is based at least in part on the pre-requisite identified;
   analyzing, using an execution environment profiler, a test execution environment of a computer system to determine an execution environment characteristic capable of causing an inconclusive result of execution of the test case, wherein the execution environment characteristic is related to the computer system,
   setting, using a result of analyzing the test execution environment, a flake parameter, the flake parameter comprising the execution environment characteristic capable of causing an inconclusive result of execution of the test case;
   comparing, using a predefined set of mappings, the test type to the flake parameter to determine whether the test type maps to the flake parameter;
   removing, from the set of test cases, responsive to determining that the test type maps to the flake parameter, the test case, the removing resulting in a filtered set of test cases;
   subsequent to the removing the test case from the set of test cases, executing, in the test execution environment, the filtered set of test cases; and
   transmitting the test case to a user interface.

2. The computer-implemented method of claim 1, further comprising:
   executing, in a second test execution environment, a second set of test cases;
   classifying, by analyzing a second test case in the second set of test cases, the second test case into a second test type;
   setting, using a result of analyzing the second test execution environment, a second flake parameter; and
   labelling, as a flake, responsive to determining that the second test type maps to the second flake parameter, the second test case.

3. The computer-implemented method of claim 1, wherein the parsing source code of the test case in the set of test cases to identify the pre-requisite to performing the test case comprises identifying, using a test logic parser, an assertion of the test case.

4. The computer-implemented method of claim 1, wherein the parsing source code of the test case in the set of test cases to identify the pre-requisite to performing the test case comprises identifying an execution dependency of the test case.

5. The computer-implemented method of claim 1, wherein setting the flake parameter comprises determining, using the execution environment profiler to analyze the test execution environment, a task load classification of the test execution environment.

6. The computer-implemented method of claim 1, wherein setting the flake parameter comprises determining, using the execution environment profiler to analyze the test execution environment, an execution concurrency capability of the test execution environment.

7. A computer program product for environment specific software test failure analysis, the computer program product comprising:
   one or more computer readable storage media, and program instructions collectively stored on the one or more computer readable storage media, the stored program instructions comprising:
   program instructions to parse source code of a test case in a set of test cases to identify a pre-requisite to performing the test case;
   program instructions to classify the test case into a test type based at least in part on the pre-requisite identified;
   program instructions to analyze, using an execution environment profiler, an execution environment of a computer system to determine an execution environment characteristic capable of causing an inconclusive result of execution of the test case, wherein the execution environment characteristic is related to the computer system, program instructions to set, using a result of analyzing the test execution environment, a flake parameter, the flake parameter comprising the execution environment characteristic capable of causing the inconclusive result of execution of the test case;

program instructions to compare, using a predefined set of mappings, the test type to the flake parameter to determine whether the test type maps to the flake parameter;

program instructions to remove, from the set of test cases, responsive to determining that the test type maps to the flake parameter, the test case, the removing resulting in a filtered set of test cases;

program instructions to, subsequent to removal of the test case from the set of test cases, execute, in the test execution environment, the filtered set of test cases; and program instructions to transmit the test case to a user interface.

8. The computer program product of claim 7, the stored program instructions further comprising:

program instructions to execute, in a second test execution environment, a second set of test cases;

program instructions to classify, by analyzing a second test case in the second set of test cases, the second test case into a second test type;

program instructions to set, using a result of analyzing the second test execution environment, a second flake parameter; and program instructions to label, as a flake, responsive to determining that the second test type maps to the second flake parameter, the second test case.

9. The computer program product of claim 7, wherein the program instructions to parse source code of the test case in the set of test cases to identify the pre-requisite to performing the test case comprises program instructions to identify, using a test logic parser, an assertion of the test case.

10. The computer program product of claim 7, wherein the program instructions to parse source code of the test case in the set of test cases to identify the pre-requisite to performing the test case comprises program instructions to identify an execution dependency of the test case.

11. The computer program product of claim 7, wherein the program instructions to set the flake parameter comprises program instructions to determine, using the execution environment profiler to analyze the test execution environment, a task load classification of the test execution environment.

12. The computer program product of claim 7, wherein the program instructions to set the flake parameter comprises program instructions to determine, using the execution environment profiler to analyze the test execution environment, an execution concurrency capability of the test execution environment.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to parse source code of a test case in a set of test cases to identify a pre-requisite to performing the test case;

program instructions to classify the test case into a test type based at least in part on the pre-requisite identified;

program instructions to analyze, using an execution environment profiler, a test execution environment of a computer system to determine an execution environment characteristic capable of causing an inconclusive result of execution of the test case, wherein the execution environment characteristic is related to the computer system;

program instructions to set, using a result of analyzing the test execution environment, a flake parameter, the flake parameter comprising the execution environment characteristic capable of causing the inconclusive result of execution of the test case;

program instructions to compare, using a predefined set of mappings, the test type to the flake parameter to determine whether the test type maps to the flake parameter;

program instructions to remove, from the set of test cases, responsive to determining that the test type maps to the flake parameter, the test case, the removing resulting in a filtered set of test cases;

program instructions to, subsequent to removal of the test case from the set of test cases, execute, in the test execution environment, the filtered set of test cases; and program instructions to transmit the test case to a user interface.

17. The computer system of claim 16, the stored program instructions further comprising:

program instructions to execute, in a second test execution environment, a second set of test cases;

program instructions to classify, by analyzing a second test case in the second set of test cases, the second test case into a second test type;

program instructions to set, using a result of analyzing the second test execution environment, a second flake parameter; and program instructions to label, as a flake, responsive to determining that the second test type maps to the second flake parameter, the second test case.

18. The computer system of claim 16, wherein the program instructions to parse source code of the test case in the set of test cases to identify the pre-requisite to performing the test case comprises program instructions to identify, using a test logic parser, an assertion of the test case.

19. The computer system of claim 16, wherein the program instructions to parse source code of the test case in the set of test cases to identify the pre-requisite to performing the test case comprises program instructions to identify an execution dependency of the test case.

20. The computer system of claim 16, wherein the program instructions to set the flake parameter comprises program instructions to determine, using the execution environment profiler to analyze the test execution environment, a task load classification of the test execution environment.

\* \* \* \* \*